Sept. 12, 1933.  T. MIDGLEY, JR  1,926,395
PROCESS OF PREVENTING FIRE BY NONTOXIC SUBSTANCES
Filed July 31, 1930
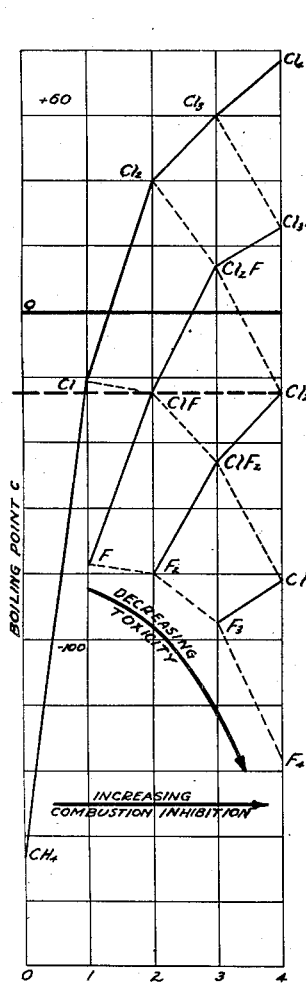
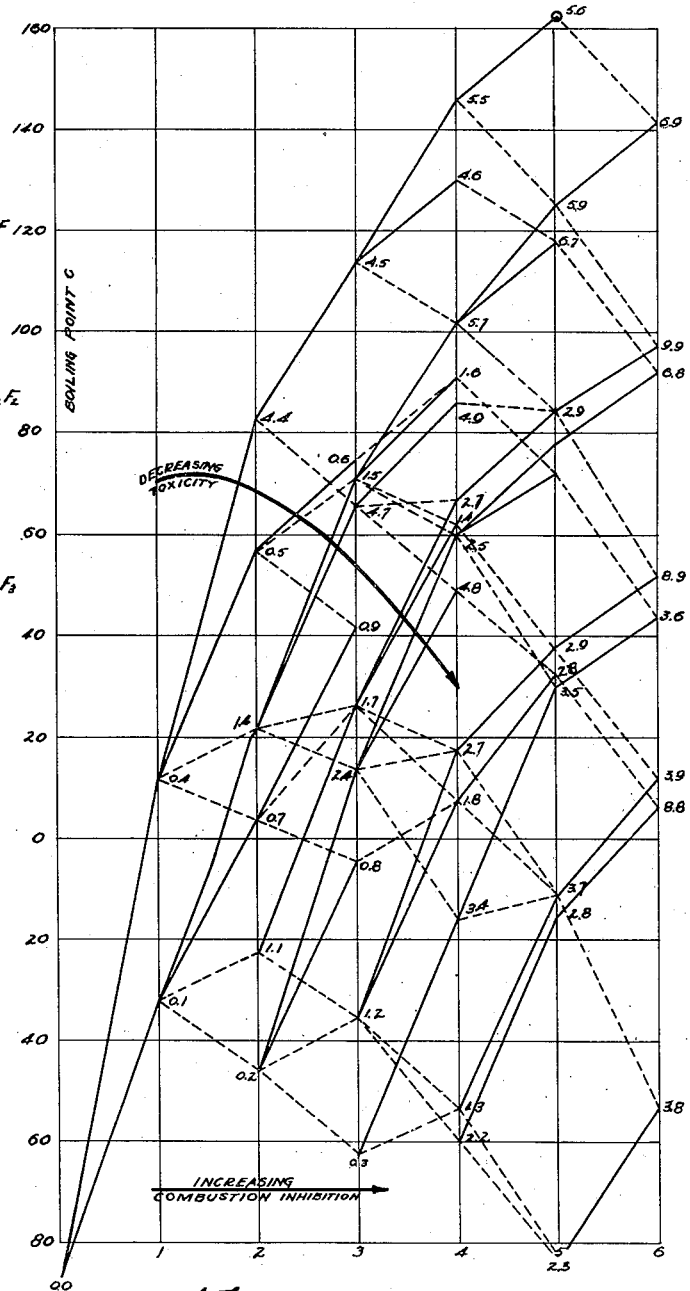
INVENTOR
Thomas Midgley Jr.
BY
ATTORNEY Patented Sept. 12, 1933

1,926,395

UNITED STATES PATENT OFFICE 1,926,395

PROCESS OF PREVENTING FIRE BY NONTOXIC SUBSTANCES

Thomas Midgley, Jr., Worthington, Ohio, assignor to Frigidaire Corporation, Dayton, Ohio, a corporation of Delaware Application July 31, 1930. Serial No. 472,179

7 Claims. (Cl. 23—9)

The object of this invention is to provide an atmospheric environment suitable for sustaining active conscious and intelligent life but which at the same time will not support combustion.

Heretofore substances which could be added to the atmosphere to create a condition which would not support combustion, thereby eliminating certain fire hazards, have been limited in number and all of them have been so toxic that when used in sufficient quantities to inhibit fire the conditions would not support normal human existence.

I have discovered that halo-derivatives of hydrocarbons containing fluorine are sufficiently non-toxic, and at the same time sufficiently powerful as inhibitors of fire that they may safely be employed for removing the hazards of fire associated with the accidental liberation of inflammable substances within substantially closed spaces and at the same time they do not prevent workmen or animals from safely entering such enclosed spaces to remove the combustible substances present. For example $CF_4$ is a compound boiling at about $-140°$ C. and is but slightly less toxic to normal intelligent life than nitrogen. The addition of small percentages of $CF_4$ produces an atmosphere that will not support combustion but will support normal human life. The exact proportion of $CF_4$ needed to induce this environment varies with the inflammability of the substances present. For example, 10% concentration of $CF_4$ is an ample safeguard against the combustion of wood, paper and similar solid inflammable materials. A higher concentration is generally used where the inflammable substance is a volatile liquid, and a still higher concentration may be used where the inflammable substance is a gas. I can create a satisfactory working environment for highly inflammable gases by the use of 30% of $CF_4$. What has just been described relative to concentration of $CF_4$ is also true as to the percentage of other halogen compounds which may be employed and the choice of compound can be made to accord with the conditions of use.

This method of creating an enviornment which supports life but inhibits flame is apparently in contrast to the usual method of merely inhibiting a flame by forming a non-combustible gas blanket over the combustible substance, such for example, as in the use of carbon dioxide, nitrogen, and other well-known flame arresters. The desired compound may be chosen from the accompanying charts which are explanatory of the compounds which may be formed which are comprised within the group of halo-derivatives of hydrocarbons containing fluorine in which the halogen may be fluorine or another halogen.

In these charts Fig. 1 shows relative values of compounds of the methane group and Fig. 2 with the key shows relative values of compounds of the ethane group. In Fig. 1, the complete formula for each compound is found by making the halogen substitution for hydrogen in the formula $CH_4$. Any compound in Fig. 2 may be named by substituting in place of the numerals in Fig. 2 the corresponding compounds given in the key, as for example 0.9 is $CH_3$—$CCl_2F$ and 2.4 is $CHF_2$—$CH_2Cl$. The arrows on the charts show increasing combustion inhibition properties with change in the character of the compound and including an increasing halogen content in proportion to hydrogen content. Another group of arrows show trend of decreasing toxicity.

On a basis of toxicity alone I prefer compounds which do not have more of the other halogen atoms in the molecule than the fluorine atoms present. On a basis of flame arresting properties, I prefer not to use compounds in which more hydrogen atoms are present in the molecule than the total halogen atoms present.

The compounds so chosen are substantially inert to human life when employed in proportion in the atmosphere which will be sufficient to inhibit flame, or in slightly greater proportion. The exact nature of the properties exhibited by these compounds which are useful in arresting the flame is at present unknown.

The method of charting may be employed with other groups of compounds coming within the general formula halo-derivatives of hydrocarbon compounds containing fluorine and including groups having a higher carbon content.

While the form of embodiment of the invention as herein disclosed, constitutes a preferred form, it is to be understood that other forms might be adopted, all coming within the scope of the claims which follow.

What is claimed is as follows:

1. Process which comprises adding to the atmosphere surrounding a possible point of combustion a quantity of an organic halo derivative containing fluorine, and limiting the said quantity added to an amount sufficient to prevent combustion while supporting the existence of human life.

2. Process which comprises adding to the atmosphere surrounding a possible point of combustion a quantity of an aliphatic organic derivative containing fluorine and limiting the said quantity added to an amount sufficient to prevent combustion while supporting the existence of human life.

3. Process which comprises adding to the atmosphere surrounding a possible point of combustion a quantity of a halo derivative of a hydrocarbon containing fluorine and limiting the said quantity added to an amount sufficient to prevent combustion while supporting the existence of human life.

4. Process which comprises adding to the atmosphere surrounding a possible point of combustion a quantity of a halo derivative of an aliphatic hydrocarbon containing fluorine and limiting the said quantity added to an amount sufficient to prevent combustion while supporting the existence of human life.

5. Process which comprises adding to the atmosphere surrounding a possible point of combustion a quantity of tetrafluoro methane and limiting the said quantity added to an amount sufficient to prevent combustion while supporting the existence of human life.

6. Process which comprises adding to the atmosphere surrounding a possible point of combustion a quantity of a halo fluoro derivative of methane and limiting the said quantity added to an amount sufficient to prevent combustion while supporting the existence of human life.

7. Process which comprises adding to the atmosphere surrounding a possible point of combustion a quantity of a halo fluoro derivative of ethane and limiting the said quantity added to an amount sufficient to prevent combustion while supporting the existence of human life.

THOMAS MIDGLEY, Jr.